United States Patent [19]
Bok

[11] 3,917,043
[45] Nov. 4, 1975

[54] FRICTION DISC MEMBER FOR BRAKE OR CLUTCH

[75] Inventor: Lowell D. Bok, Anna, Ohio

[73] Assignee: The B.F. Goodrich Company, Akron, Ohio

[22] Filed: June 17, 1974

[21] Appl. No.: 480,113

[52] U.S. Cl............................ 192/107 R; 188/218 XL
[51] Int. Cl.² ............................................ F16D 13/60
[58] Field of Search .................. 192/107 R, 107 C; 188/218 XL

[56] References Cited
UNITED STATES PATENTS

| | | | |
|---|---|---|---|
| 2,541,979 | 2/1951 | Amundsen | 192/107 R |
| 3,483,953 | 12/1969 | Bender | 192/107 R |
| 3,605,967 | 9/1971 | Warren et al. | 192/107 R |
| 3,746,139 | 7/1973 | Bok et al. | 192/107 R |
| 3,747,712 | 7/1973 | Stout | 192/107 R X |
| 3,757,907 | 9/1973 | Crossman et al. | 192/107 R X |

*Primary Examiner*—Benjamin W. Wyche
*Attorney, Agent, or Firm*—W. A. Shira, Jr.

[57] ABSTRACT

An annular disc of heat sink material sandwiched between friction lining segments has radially extending slots in a peripheral edge with slidable blocks of heat sink material located in the slots. The friction lining segments have edges in engagement with edges of the blocks for retaining the blocks in position and transferring torque forces from the friction lining segments to the annular disc through the blocks of heat sink material.

16 Claims, 8 Drawing Figures

FRICTION DISC MEMBER FOR BRAKE OR CLUTCH

BACKGROUND OF THE INVENTION

This invention relates to disc type brakes or clutches and particularly to the annular friction disc members which engage other friction disc members during operation of the brake or clutch. Friction disc members used in the brakes of high performance aircraft must absorb great quantities of heat during the braking operation and must also be able to withstand the high temperatures which result from the braking operation. The heat absorbing capacity has been obtained by using heat absorbing material such as beryllium; however, because of the high cost of this material, a friction lining material is needed for engagement with other rotating brake parts.

The friction lining material used in brakes of this type must also withstand high temperatures, have good wearing characteristics and a low density to meet the weight and space requirements of modern aircraft. It is also desirable to mount the friction lining material on the friction disc members so that it may be replaced without requiring replacement of the complete disc.

The friction lining material may be in segments which are mounted at circumferentially spaced-apart positions around the faces of the friction disc member; however, provisions must be made to transmit the torque from the friction lining material segments to the disc member and also to resist the rotation of the segments which may occur due to the forces on the segments during frictional engagement with other rotating brake members.

Friction disc members of this type used heretofore have utilized different forms of connecting members between an annular heat sink disc and friction lining segments covering the opposing faces of the disc. These connecting members which may have had overlapping flanges have been made of steel or other wear-resisting material and have been fastened in position by rivets. The weight and space necessary for the connecting members has reduced the effectiveness of the brake especially in aircraft applications where weight and space limitations are critical.

SUMMARY OF THE INVENTION

According to this invention, the connecting block members may be of heat sink material such as beryllium and thereby can be of a relatively light material and also provide heat absorption to increase the heat absorbing capacity of the brake without increasing the space required. Connecting block members are slidably mounted in stress relieving slots in the annular heat sink disc and held in position by interlocking edges of the friction lining segments and the block members. No rivets or other fasteners are required in the heat-swept area. The connecting block members serve the dual function of transferring the torque load from the friction lining segments to the annular heat sink disc and the provision of a heat sink to eliminate any weight and space penalty for connecting the lining segments and the heat sink disc. The lining segments also serve the dual function of holding the block members in position and providing a protective body for engagement with other rotating brake parts.

The accompanying drawings show one preferred form of stator and rotor made in accordance with and embodying this invention and which is representative of how this invention may be practiced.

DETAILED DESCRIPTION

Figure 1:
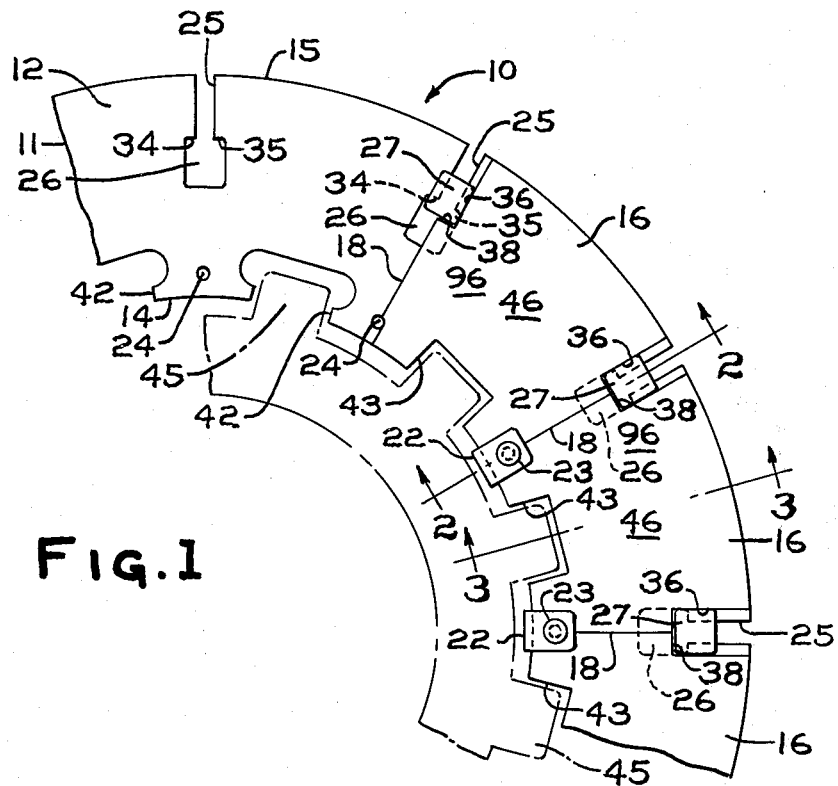
FIG. 1 is a side elevation of a portion of an annular stator friction member with certain parts being broken away, illustrated in torque driving engagement with a related part which, in this example, may be a spliced torque tube, the sides being represented by chain-dotted lines.
Figure 2:
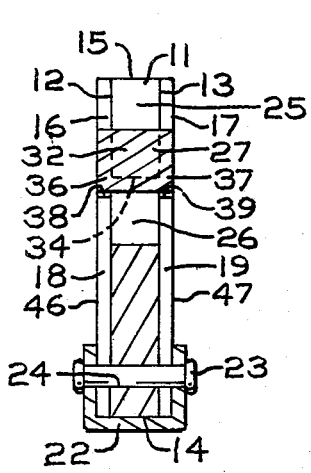
FIG. 2 is a sectional view taken along the plane of line 2—2 of FIG. 1.

Referring to FIG. 1, a friction member 10 which may be a stator of a brake or clutch mechanism is shown. The friction member 10 has an annular rigid disc member 11 with opposing faces 12 and 13, an inner peripheral edge 14 and an outer peripheral edge 15. Preferably, the disc member 11 is of a heat sink material having a quality of absorbing large quantities of heat during the braking operation. Beryllium has been found to be a suitable material and is the material used in the embodiment shown.

Sector shaped friction lining segments 16 and 17 are mounted on the opposing faces 12 and 13 of the disc member 11 at circumferentially spaced-apart positions around the disc member. The friction lining segments 16 and 17 may be of a friction lining material such as carbon composite material made from pyrolized graphite cloth having a friction surface of graphite which may also be of pyrolized resin or other material. This carbon friction lining material is highly resistant to high temperatures and provides good wear properties. It is also a material of low density and meets the weight requirements of a high energy aircraft brake.

The friction lining segments 16 and 17 have radially extending edges 18 and 19 with the opposing radially extending edges of adjacent segments being in abutting relationship as shown in FIG. 1. Clamping members such as U-shaped brackets 22 extend around the inner peripheral edge 14 of the friction member 10 overlapping the friction lining segments 16 and 17 and clamping the segments to the disc member 11 by rivets 23 extending through the arms of the brackets 22 and holes 24 in the disc member. The radially extending edges 18 and 19 of the segments 16 and 17 may be offset at the inner peripheral edge 14 to provide clearance for the rivets 23.

Figure 4:
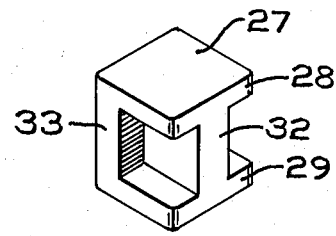
FIG. 4 is an enlarged view in perspective of the connecting block member shown in FIGS. 1 and 2.

Slots 25 in the outer peripheral edge 15 of the disc member 11 extend radially into the body of the disc member and terminate at enlarged openings 26 at the ends of the slots. The openings 26 are large enough for insertion of connecting block members such as sliding blocks 27, shown more clearly in FIG. 4. Each of the block members 27 has flanges 28 and 29 for overlapping the faces 12 and 13 of the disc member 11. A web 32 connects the flanges 28 and 29 and has a width approximately equal to the width of the slots 25 in the disc member 11 for sliding movement of the blocks 27 from the openings 26 into the slots. This movement is limited by a stop member or back plate 33 on each of the sliding blocks 27 which engages circumferentially extending edges 34 and 35 at the radially outer side of the enlarged openings 26 in the disc member 11.

The radially extending edges 18 and 19 of the friction lining segments 16 and 17 have recesses 36 and 37 providing interlocking edges 38 and 39 for engagement with the edges of the sliding blocks 27 and holding the sliding blocks in place in the slots 25. The sliding blocks 27 may also be of a heat sink material such as beryllium having the quality of absorbing large quantities of heat during the braking operation.

Figure 3:
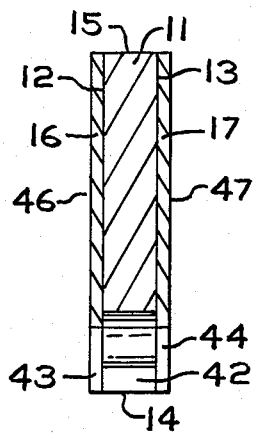
FIG. 3 is a sectional view taken along the plane of line 3—3 of FIG. 1.

Axially extending grooves 42 in the disc member 11 are spaced at circumferentially spaced-apart positions along the inner peripheral edge 14. The friction lining segments 16 and 17 also have axially extending grooves 43 and 44 at the inner peripheral edge 14 and coinciding with the grooves 42 in the disc member 11 as shown in FIGS. 1 and 3. The grooves 42, 43 and 44 are positioned for engagement with mating interfitting splines 45 of an associated torque tube which is represented by chain-dotted lines in FIG. 1.

In operation of the stator friction member 10, shown in FIGS. 1 through 4, the sliding blocks 27 are held in position in the slots 25 by the interlocking edges 38 and 39 of the segments 16 and 17. Torque forces are applied to the friction lining segments 16 and 17 in heat-swept areas 46 and 47 radially outward of the U-shaped brackets 22 and splines 45. These forces are transmitted through the sliding blocks 27 in engagement with the interlocking edges 38 and 39 of the segments to the disc member 11 and then to the splines 45 in engagement with the edges of the grooves 42 in the disc member. Rotation of the friction lining segments 16 and 17 is also resisted by engagement of the interlocking edges 38 and 39 of the segments with the sliding blocks 27 in addition to the engagement of the radially extending edges 18 and 19 with the rivets 23 through the U-shaped brackets 22 and the engagement of the edges of the grooves 43 and 44 with the splines 45.

In order to disassemble the friction member 10, it is only necessary to remove the rivets 23 making possible the removal of the U-shaped brackets 22 after which the segments 16 and 17 can be lifted away from the opposing faces 12 and 13 of the disc member 11. The sliding blocks 27 can then be moved radially inward out of the slots 25 and then slipped out of the enlarged openings 26. The assembly may be performed by reversing this process.

Referring to FIGS. 5 through 8, a friction member 50 for a brake or clutch is shown which, in this case, may be a rotor and have an annular rigid disc member 51 with opposing faces 52 and 53 between an inner peripheral edge 54 and an outer peripheral edge 55. The disc member 51 may be of a heat sink material such as beryllium having the quality of absorbing large quantities of heat during the braking operation.

Figure 5:
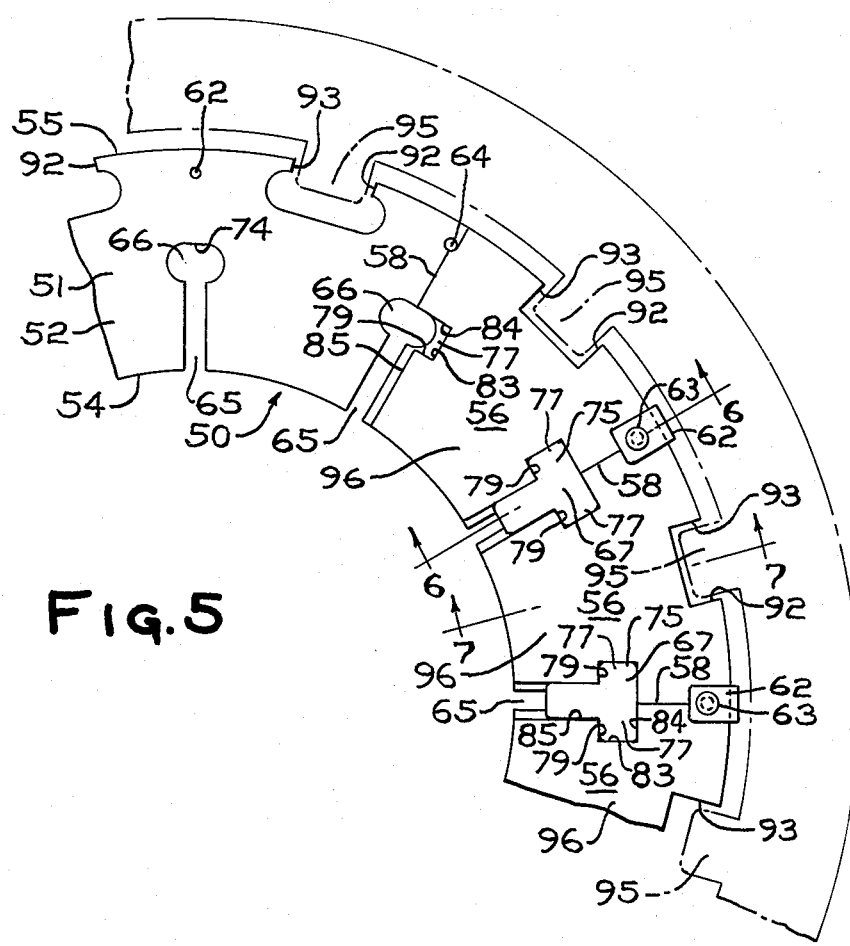
FIG. 5 is a side elevation of a portion of an annular rotor friction member with certain parts being broken away, illustrated in torque driving engagement with a related part which, in this example, may be a ribbed wheel, the sides being represented by chain-dotted lines.
Figure 6:
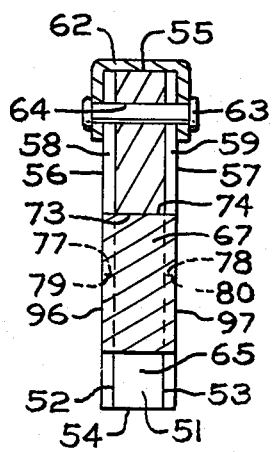
FIG. 6 is a sectional view taken along the plane of line 6—6 of FIG. 5.
Figure 7:
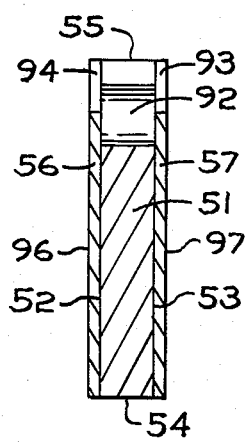
FIG. 7 is a sectional view taken along the plane of line 7—7 of FIG. 5.
Figure 8:
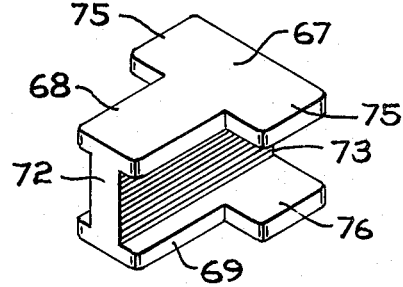
FIG. 8 is an enlarged view in perspective of the connecting block member shown in FIGS. 5 and 6.

Friction lining segments 56 and 57 which may be sector shaped and spaced circumferentially around the disc member 51 are mounted on the opposing faces 52 and 53 of the disc member. These segments 56 and 57 may be of a hard durable friction material such as carbon made from pyrolized graphite cloth having a friction surface of graphite which may also be of pyrolized resin or other material. The friction lining segments 56 and 57 have radially extending edges 58 and 59 and, as shown in FIG. 5, the radially extending edges are substantially in abutting relationship with adjacent segments. Clamping members such as U-shaped brackets 62 extend around the outer peripheral edge 55 of the disc member 51 and overlap the lining segments 56 and 57 with the arms of the U-shaped brackets being clamped to the segments by rivets 63 extending through holes 64 in the disc member 51 at positions between adjacent segments as shown in FIG. 5. The radially extending edges 58 and 59 are offset to provide clearance for the rivets 63.

Slots 65 are provided in the disc member 51 extending radially outward from the inner peripheral edge 54 at spaced-apart positions around the disc member into the body of the disc member to enlarged openings 66 at the ends of the slots. Connecting block members such as sliding blocks 67 have flanges 68 and 69 for overlapping the opposing faces 52 and 53 of the disc member 51. A web 72 connects the flanges 68 and 69 and has a width approximately equal to the width of the slots 65 so that the sliding blocks 67 may be inserted in the slots and moved radially outward to the enlarged openings 66. A forward end 73 of each of the sliding blocks 67 acts as a stop member for engaging circumferentially extending edges 74 of the enlarged openings 66 to limit the movement of the sliding blocks radially outward in the slots.

The sliding blocks 67 have circumferentially extending tenon members 75 and 76 extending outwardly from the flanges 68 and 69 which fit in circumferentially extending recesses 77 and 78 in the radially extending edges 58 and 59 of the segments 56 and 57. The recesses 77 and 78 provide interlocking edges 79 and 80 to prevent movement of the sliding blocks radially inward of the disc 51. Other interlocking edges 83, 84 and 85 of segments 56 engage the edges of the flanges 68 and tenon member 75 for holding the sliding blocks 67 in place and transferring forces from the segments 56 to the disc member 51. Corresponding interlocking edges are also provided in segment 57.

Axially extending grooves 92 are provided in the outer peripheral edge 55 of the disc member 51 at spaced-apart positions circumferentially around the disc member. Corresponding grooves 93 and 94 are provided in the segments 56 and 57 for engagement with mating interfitting ribs 95 of a wheel or other rotating member represented in chain-dotted lines.

The sliding blocks 67 may be of a heat sink material such as beryllium having the quality of absorbing large quantities of heat during the braking operation. The friction lining segments 56 and 57 may be of a carbon composite material made from pyrolized graphite cloth having a friction surface of graphite which may also be of a pyrolized resin or other material.

In this embodiment, the friction lining segments 56 and 57 are engageable with the surface of another braking member (not shown) in heat-swept areas 96 and 97 radially inward of the U-shaped brackets 62 and the ribs 95.

Disassembly of the friction member 50 may be accomplished by removing rivets 63 making possible removal of U-shaped brackets 62 and removal from the opposing faces 52 and 53 of the disc member 51 of the segments 56 and 57. The sliding blocks 67 may then be moved radially inward out of the slots 65. After replacement of any worn parts, assembly of the friction member may be accomplished by reversing the procedure set forth above.

In operation, the sliding blocks 67 convey torque forces applied to the heat-swept areas 96 and 97 of the friction lining segments 56 and 57 through the interlocking edges, 79 through 85, to the disc 51 and then to the interfitting ribs 95. Rotation of the segments 56 and 57 is limited by the sliding blocks 67 and by the rivets 63 engaging the radially extending edges 58 and 59 of the segments. Also the interfitting ribs 95 engaging the grooves 93 and 94 in the segments will limit rotation.

Although the sliding block and interlocking edges for only one rotor and one stator have been shown, it is understood that other sliding block interlocking arrangements coming within the scope of this invention may be provided.

I, therefore, particularly point out and distinctly claim as my invention:

1. A friction member for a brake or clutch comprising an annular rigid disc member, friction lining segments positioned on the face of said disc member and spaced circumferentially around said disc member, said segments being sector shaped and having recesses, said disc member having a peripheral edge and slots extending radially of said annular disc member from said edge into the body of said disc member, block members in said slots, said block members having flanges in overlapping relation with the face of said disc member, said slots terminating in enlarged openings, said block members being slidable to positions at said openings, said lining segments and said block members having interlocking edges including the edges of said recesses and the edges of said flanges to prevent movement of said block members in said slots away from said enlarged openings and to transmit torque forces through said block members from said segments to said disc member.

2. A friction member for a brake or clutch comprising an annular rigid disc member, sector-shaped friction lining segments positioned on the face of said disc member and spaced circumferentially around said disc member, said disc member having a peripheral edge and slots extending radially of said annular disc member from said edge into the body of said disc member, block members in said slots, said lining segments having radially extending edges, recesses located in said radially extending edges, said segments being positioned in side-by-side relationship with said recesses of adjacent segments positioned over said slots and said lining segments and said block members having interlocking edges including the edges of said recesses to prevent movement of said block members in said slots and to transmit torque forces through said block members from said segments to said disc member.

3. A friction member according to claim 2 wherein said slots extend radially inward from an outer peripheral edge to enlarged openings at the ends of said slots, said block members being movable into said openings and slidable radially outward in said slots and at least one of said edges of each of said recesses extending circumferentially of said disc member for preventing movement of said block radially inward of said disc member.

4. A friction member according to claim 3 wherein said disc member and said segments have axially extending grooves at said inner periphery for engagement with a spline of a nonrotatable member for resisting turning of said disc member.

5. A friction member according to claim 4 wherein said segments are engageable with associated friction members at radially outward heat-swept areas and said segments are clamped to said disc member at positions adjacent said inner peripheral edge spaced from said heat-swept areas.

6. A friction member according to claim 5 wherein said disc member has substantially parallel faces on opposite sides, said segments are positioned at circumferentially spaced-apart positions on both of said parallel faces and clamping members overlap said segments on opposite sides of said disc at said inner peripheral edge for clamping said segments to said disc.

7. A friction member according to claim 6 wherein said clamping members are positioned at said radially extending edges of said segments so that each of said clamping members overlaps opposing edges of adjacent segments in clamping relationship.

8. A friction member according to claim 3 wherein each of said block members has a stop member for engagement with an edge of said enlarged opening to limit sliding movement of said block members radially outward in said slots.

9. A friction member according to claim 2 wherein said slots extend radially outward from an inner peripheral edge and terminate in enlarged openings, said block members being slidable radially outwardly in said slots and at least one of said edges of each of said recesses extending circumferentially of said disc member for preventing movement of said block members radially inward.

10. A friction member according to claim 9 wherein said segments have axially extending grooves at an outer peripherial edge for engagement with ribs of a rotatable member for turning of said disc member and said segments with said rotatable member.

11. A friction member according to claim 10 wherein said segments are engageable with associated friction members at radially inward heat-swept areas and said segments are clamped to said disc member at positions adjacent said outer peripheral edge spaced from said heat-swept areas.

12. A friction member according to claim 11 wherein said disc member has substantially parallel faces on opposite sides, said segments being positioned at circumferentially spaced-apart positions on both of said parallel faces and clamping members overlapping said segments on opposite sides of said disc at said outer peripheral edge for clamping said segment to said disc.

13. A friction member according to claim 12 wherein said clamping members are positioned at said radially extending edges of said segments so that each of said clamping members overlaps opposing edges of adjacent segments in clamping relationship.

14. A friction member according to claim 13 wherein each of said block members has circumferentially extending tenon members on said flanges and said segments having circumferentially extending recesses in said radially extending edges for receiving said tenon members in movement limiting and torque transmitting engagement thereof.

15. A friction member according to claim 2 wherein said annular disc member is of beryllium, said block members are of beryllium and said friction lining segments are of carbon composite material.

16. A friction member for a brake or clutch comprising an annular rigid disc member, sector-shaped friction lining segments positioned on the face of said disc member and spaced circumferentially around said disc member, said disc member having a peripheral edge and slots extending radially of said annular disc member from said edge into the body of said disc member, block members in said slots, said lining segments having radially extending edges, said segments being positioned in side-by-side relationship with said recesses of said segments positioned over said slots, and said lining segments and said block members having interlocking edges including the edges of said recesses to prevent movement of said block members in said slots and to transmit torque forces through said block members from said segments to said disc member.

* * * * *